United States Patent
Al-Taq et al.

(10) Patent No.: US 7,328,746 B2
(45) Date of Patent: Feb. 12, 2008

(54) METHOD AND COMPOSITION FOR FORMING PROTECTIVE PRECIPITATE ON CEMENT SURFACES PRIOR TO FORMATION ACIDIZING TREATMENT

(75) Inventors: Ali A. Al-Taq, Qatif (SA); Hisham A. Nasr-El-Din, Dhahran (SA); Tawfiq A. Al-Shafai, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 328 days.

(21) Appl. No.: 11/070,105

(22) Filed: Mar. 1, 2005

(65) Prior Publication Data
US 2006/0196666 A1 Sep. 7, 2006

(51) Int. Cl.
*E21B 37/08* (2006.01)
*E21B 43/27* (2006.01)

(52) U.S. Cl. .................. 166/300; 166/307; 166/312
(58) Field of Classification Search .............. None
See application file for complete search history.

(56) References Cited

U.S. PATENT DOCUMENTS

| | | | |
|---|---|---|---|
| 2,367,350 A | 1/1945 | Heigl | |
| 2,885,004 A | 5/1959 | Perry | |
| 3,180,416 A | 4/1965 | Smith | |
| 3,254,718 A | 6/1966 | Dunlap | 166/307 |
| 3,367,417 A | 2/1968 | McCabe | |
| 3,543,856 A | 12/1970 | Knox | 166/281 |
| 3,548,945 A | 12/1970 | Gidley | 166/307 |
| 3,889,753 A | 6/1975 | Richardson | 166/307 |
| 3,948,324 A | 4/1976 | Lybarger | 166/307 |
| 4,056,146 A | 11/1977 | Hall | 166/300 |
| 4,151,878 A | 5/1979 | Thomas | 166/307 |
| 4,219,429 A | 8/1980 | Allen et al. | 507/221 |
| 4,479,543 A | 10/1984 | Kalfayan et al. | 166/300 |
| 4,665,990 A * | 5/1987 | Perlman | 166/307 |
| 5,099,924 A | 3/1992 | Gidley | 166/307 |
| 5,375,660 A | 12/1994 | Wehunt | |
| 5,529,125 A | 6/1996 | Di Lullo Arias et al. | 166/307 |
| 2006/0073980 A1 * | 4/2006 | Brannon et al. | 507/103 |

OTHER PUBLICATIONS

SPE 18986; J.L. Brady, L.L. Gantt, D.M.Fife, and D.A. Rich, ARCO Alaska Inc.; S.W. Almond, Halliburton Services; and D.A. Ross, JB-Titan Services; *Cement Solubility in Acids*, 1989.
SPE 31080; E.P. de Motta, SPE, Petrobras and C.R. Miranda, Petrobras and S.M.C. Anjos, Petrobras, and E. Chaves Jr., Perobras; *Acidizing Wells With Acetic/HF Acid Mixtures to Minimize Cement Dissolution*, 1995.
SPE 37225; C.R. Miranda—Petrobras and J.S. Gold, East Stroudsburg University; *Study of Cement Resistance to the Attack of Acid Solutions*, 1997.
SPE 36112; M.G.P. Silva, SPE, Petrobras and C.R. Miranda, Petrobras and R. Vicente, PETROBRAS; *Optimization of Cementing and Acidizig Operations is The Key To Minimiz Acid Damage to the Cemented Annulus*, 1996.
SPE 26571; J.F. Heathman, Halliburton Energy Services; R.B. Carpenter; Arco Oil & Gas Col; G.S. Sanders, ARCO Alaska Inc.; and M.L. Wedman, Halliburton Energy Services; *Acid-Resistant Microfine Squeeze Cement; From Conception to Viable Technology*, 1993.
SPE 18475; I.C. Jacobs, Petrolite Corp; *Chemical Systems for the Control of Asphaltene Sludge During Oilwell Acidizing Treatments*, 1989.
Curtis G. Blount, SPE, Jerry L. Brady, SPE, Dustin M. Fife, SPE, Lamar L. Gantt, SPE, Julie M. Heusser, SPE, and C. Mel Hightower, SPE, Arco Alaska Inc.; *HCl/HF Acid-Resistant Cement Blend: Model Study and Field Application*, 1991.

* cited by examiner

*Primary Examiner*—Zakiya W. Bates
(74) *Attorney, Agent, or Firm*—Abelman, Frayne & Schwab

(57) ABSTRACT

A method and composition for protecting cement surfaces in a well bore treatment zone from the destructive effects of acid mud and other acidization processes commonly used to stimulate hydrocarbon production from the formation, includes contacting the cement with an aqueous acid mixture of HAc and HF in a mutual solvent for a sufficient period of time to form a protective deposit or precipitate layer that is resistant to the acidization composition. In a preferred embodiment, the aqueous acid mixture includes corrosion inhibitors and inhibitor aids, and a preflush with an ammonium chloride solution in a mutual solvent is used to prepare the cement surfaces in the treatment zone.

10 Claims, No Drawings

METHOD AND COMPOSITION FOR FORMING PROTECTIVE PRECIPITATE ON CEMENT SURFACES PRIOR TO FORMATION ACIDIZING TREATMENT

FIELD OF THE INVENTION

This invention relates to the preservation of cement in/or near the wellbore area, including cement bridge plugs, typically placed in the wellbore for water shut-off, or cement behind casing, typically employed between the wellbore casing and the formation to provide interzonal isolation. The preservation of cement is employed when the well must be subjected to mud acid or other acidization treatments to increase permeability to improve formation productivity.

BACKGROUND OF THE INVENTION

Acid solutions are often employed to stimulate the production of fluids from sandstone and other siliceous formations surrounding oil and gas production wells by improving permeability.

The methods are generally referred to as acidizing processes and include the injection of an aqueous solution containing a mixture of hydrofluoric and hydrochloric acids into the formation and the subsequent production of the spent acid from the formation into the well bore.

Siliceous formations have been acidized by contact with mud acid. As used herein, "mud acid" refers to an aqueous solution of hydrofluoric acid (HF) and at least one acid selected from hydrochloric acid (HCl,) acetic acid (HAc) or formic acid; usually, the acid in addition to HF is HCl. As is well understood in the art, the derivation of the HCl and HF is not critical, so that "mud acid" may also include aqueous solutions of chemicals which react quickly to form HCl and HF, i.e., so that by the time the solution reaches the formation, the active ingredients are HF and HCl. The respective concentrations of HCl and HF may vary over wide ranges, with the lower limits being more a matter of practicality rather than operability, and the upper limits being a matter of mutual solubility of the two acids.

It has been reported that heated and pressurized acid is able to enter microfractures in the cemented annulus between the casing and formation resulting in significant acid damage to even latex-containing cement.

Laboratory test work has been reported indicating that acetic acid alone, or in combination with HF, dissolves much less cement than HCl and HCl—HF mixtures, while providing the same carbonate-dissolving ability. It is reported that the reaction of acetic acid with cement forms a protective skin that inhibits further acid attack.

The literature also reports that when laboratory samples of hardened slurry cement were subjected to attack by solutions containing HF, a surface layer of fluorite was observed to have formed. The fluorite was reported to be more soluble in HCl than in HAc.

Other laboratory tests undertaken on cement cubes reported that exposure to HCl—HF mixtures appeared to result in the formation of a protective skin of amorphous silica that slowed or inhibited the reaction with HCl. It was also reported that HF reacted with an HF-soluble portion of the cement, i.e., the amorphous silica component, so long as there was shear at the acid/cement interface to remove the protective skin formed on the cement.

It is also known from U.S. Pat. No. 3,543,856 that a formation to be treated with an aqueous solution of HCl and HF can be preflushed with an aqueous ammonium chloride solution to displace water containing metallic ions and to serve as a stabilizing agent for water sensitive clay.

As a result of these findings, acetic acid has been substituted for some or all of the HCl used in acid muds and other acidization compositions. The reduction in the adverse effects of acid treatments which include acetic acid is reported to be the formation of a deposit or protective layer that slows or minimizes the rate of attack of the other acids used in the well or formation-treating process.

It is therefore an object of the present invention to provide a process for pretreating an existing cement plug or other cement construction in a well bore in order to protect the cement from attack and deterioration when it is contacted during acidizing operations.

Another object of the invention is to provide a process that can quickly and effectively protect the surfaces of cement compositions in a well bore from the destructive effects of subsequent acid contact.

It is still another object of the invention to provide a process that can be utilized to preserve the integrity of cement seals and plugs under a variety of pre-existing conditions in the region of a well bore and formation that is to be subjected to acidization.

A further object of the invention is to provide a method and composition for forming protective precipitates on exposed cement surfaces that will eliminate or minimize deleterious effects of subsequent acidization treatments of the adjacent formation.

SUMMARY OF THE INVENTION

The above objects and other advantages are achieved by the present invention which provides a method for protecting cement surfaces in a treatment zone from the destructive effects of contact with acid-containing compositions utilized to treat the adjacent reservoir rock formation, the method comprising the steps of:

a) contacting the cement surfaces to be protected with an aqueous acid mixture of acetic acid and hydrofluoric acid for a sufficient period of time to form a protective precipitate on the surface of the cement; and b) flushing any remaining aqueous acid mixture from the surface of the treated cement.

In one preferred embodiment of the invention, the reservoir rock formation adjacent the surfaces to be treated is isolated to prevent contact of the HAc and HF with the formation.

In a further preferred embodiment, the method includes the additional step, ahead of step (a) of pre-treating the surface of the cement that is to be protected with a solution of aqueous ammonium chloride and a mutual solvent, such as ethylene glycol monobutyl ether, to displace any formation brine and to dissolve any oily material that is present in the well bore.

Other solvents that are miscible with both the aqueous ammonium chloride and the petroleum include diethylene glycol monobutyl ether, 1-butanol, 2-butanol, 1-pentanol, 2-pentanol, acetone methyl ethyl ketone, dioxane, ethyl alcohol, propanol and diacetone.

In the practice of the method of the present invention, the HAc/HF mixture is prepared with a mutual solvent at a concentration of about 10 percent by volume. The mutual solvent enhances the action of the acid mixture with the cement and inhibits the formation of an emulsion during the pumping and delivery of the aqueous acid mixture to the treatment zone.

As presently understood, the desirable results achieved by the practice of the method of the present invention is the formation of a precipitate of $CaF_2$ on the surface of the cement in the treatment zone. The aqueous acid mixture of HAc/HF must remain in contact with the cement for a period of time that is sufficient to form a protective barrier layer of the precipitate. A minimum of two (2) hours contact time prior to introduction of mud acid into the treatment zone should be provided to permit formation of the protective precipitate.

The HAc is preferably an aqueous solution at a concentration of 1.67M. The HF is also an aqueous solution at a concentration of 0.75M.

The preferred ratio of HAc to HF in the mixture is from 10/1.5 wt. %, based upon the preferred molar concentrations specified above.

The acid mixture can also include corrosion inhibitors and inhibitor aids that are well known in the art. The selection of a corrosion inhibitor package is based upon the conditions in the well bore in the treatment zone, including the temperature.

Suitable inhibitors include inorganic arsenic compounds, acetylenic alcohols, thiophenols, heterocyclic nitrogen compounds, substituted thioureas, rosin amine derivatives, quaternary ammonium compounds and similar organic agents. Other additives may also be present. These include surfactants designed to function as demulsifiers, wetting agents, antisludge agents, and retarding agents; complexing agents intended to prevent the formation of gelatinous hydroxides; gelling agents for reducing the pressure drop through the tubing, retarding the acid reaction rate, and reducing fluid losses during acid fracturing operations; diverting agents intended for temporarily plugging the more permeable zones and thus promoting more uniform acid attack; and similar materials. A wide variety of additives designed to perform these and related functions are available commercially and are familiar to those skilled in the art. The additives selected should, of course, be compatible with the particular aqueous acid mixture of HAc/HF.

The following example illustrates the practice of the invention in the treatment of a formation in which the production of gas and/or oil is to be stimulated by increasing permeability using an acid mud treatment that includes HCl and HF and in which cement has been added to the well bore to establish an interzonal plug against the incursion into the production zone by water from below.

EXAMPLE 1

This example describes the method of the invention for treating a cement bridge plug that has been placed in the wellbore for water shutoff.

Production is shut down in accordance with steps conventionally undertaken in preparation for acid stimulation treatment of the formation. In order to prevent treating fluids from entering into the formation from the cement that is to be treated, the wing valve of the well is opened.

The well bore area comprising the treatment zone is then preflushed with a 3% to 5% ammonium chloride solution and 10% by volume of solvent which is ethylene glycol monobutyl ether. This preflushing displaces any formation brine that is present and removes any oily materials that may have deposited on the cement surfaces to be treated.

Thereafter, an aqueous acid mixture of HAc and HF that includes an appropriate corrosion inhibitor package and inhibitor aid is prepared for injection into the treatment zone. The aqueous acid mixture is delivered to the treatment zone where it remains in contact with the cement surface for at least two hours. The contact time of the aqueous acid mixture with the cement is sufficient to form a protective layer on the surface of the cement that will protect the cement from attack by the mud acid composition which is to follow. Since the treated cement serves as a cement bridge plug in the wellbore, the preflush is circulated out after a soaking time of at least 2 hours.

EXAMPLE 2

This example describes the method of the invention used for treating cement nodules contained in perforations.

The same stepwise procedure that is set forth in Example 1 is followed by addition of an HCl/HF acidizing solution.

Once the desired protective superficial layer has been formed on the cement, the formation is again opened to contact and the conventional acid mud composition is delivered to the treatment zone. The mud acid treatment proceeds in accordance with the prior art.

As a result of the protection of the cement in the treatment zone in accordance with the method and composition of the invention, the integrity of the interzonal seal provided by the cement is not affected. The productivity of the formation is enhanced and no re-cementing in the treatment zone is required.

Other modifications and variations of the method and composition of the invention will become apparent to those of ordinary skill in the art based on the above description and the scope of the invention is therefore to be determined with reference to the claims which follow.

What is claimed is:

1. A method for protecting cement surfaces in a treatment zone from the destructive effects of contact with acid-containing compositions utilized to treat the adjacent reservoir rock formation, the method comprising the steps of:
   (a) contacting the cement surfaces to be protected with an aqueous acid mixture of acetic acid and hydrofluoric acid for a sufficient period of time to form a protective precipitate on the surface of the cement; and
   (b) flushing any remaining aqueous acid mixture from the surface of the treated cement.

2. The method of claim 1 in which the aqueous acid mixture further comprises a mutual solvent.

3. The method of claim 2, wherein the mutual solvent is selected from the group consisting of ethylene glycol monobutyl ether, ethylene glycol dimethyl ether, diethylene glycol dimethyl ether, ethylene glycol monopropyl ether, ethylene glycol and monoethyl ether.

4. The method of claim 3, wherein the preferred solvent is ethylene glycol monobutyl ether.

5. The method of claim 1, wherein the aqueous acid mixture is contacted with the surface of the cement for at least two hours.

6. The method of claim 1, wherein the aqueous acid mixture comprises 10 wt % HAc and 1.5 wt % HF.

7. The method of claim 6, wherein the aqueous acid mixture includes a corrosion inhibitor package.

8. The method of claim 1 which includes prior to (a) the further step of contacting the cement surfaces with a solution of aqueous ammonium chloride and a mutual solvent to thereby displace any formation brine and oily materials present on the cement surfaces.

9. The method of claim 8, wherein the mutual solvent is selected from the group consisting of ethylene glycol dimethyl ether, diethylene glycol dimethyl ether, ethylene glycol monopropyl ether and ethylene glycol monoethyl ether.

10. The method of claim 9, wherein the solvent is ethylene glycol monobutyl ether.

* * * * *